United States Patent
Li et al.

(12) 
(10) Patent No.: US 12,495,795 B2
(45) Date of Patent: Dec. 16, 2025

(54) EMULSIFIER SYSTEM FOR AGRICULTURAL COMPOSITIONS COMPRISING A PESTICIDAL NATURAL OIL

(71) Applicant: Terramera, Inc., Vancouver (CA)

(72) Inventors: Hangsheng Li, Vancouver (CA); Doug Ta Hung Chou, Vancouver (CA)

(73) Assignee: Terramera, Inc., Vancouver (CA)

( * ) Notice: Subject to any disclaimer, the term of this patent is extended or adjusted under 35 U.S.C. 154(b) by 984 days.

(21) Appl. No.: 17/419,686

(22) PCT Filed: Dec. 20, 2019

(86) PCT No.: PCT/CA2019/051896
§ 371 (c)(1),
(2) Date: Jun. 29, 2021

(87) PCT Pub. No.: WO2020/140151
PCT Pub. Date: Jul. 9, 2020

(65) Prior Publication Data
US 2022/0079144 A1 Mar. 17, 2022

Related U.S. Application Data

(60) Provisional application No. 62/787,175, filed on Dec. 31, 2018.

(51) Int. Cl.
*A01N 25/04* (2006.01)
*A01N 65/00* (2009.01)

(52) U.S. Cl.
CPC .............. *A01N 25/04* (2013.01); *A01N 65/00* (2013.01)

(58) Field of Classification Search
CPC .......... A01N 25/30; A01N 65/00; A01N 25/04
See application file for complete search history.

(56) References Cited

U.S. PATENT DOCUMENTS

| | | | |
|---|---|---|---|
| 8,709,513 B2 * | 4/2014 | Gutsche | A01N 41/02 424/93.461 |
| 2014/0242199 A1 | 8/2014 | Manhas et al. | |
| 2015/0065346 A1 * | 3/2015 | Baseeth | A01N 25/32 424/757 |

FOREIGN PATENT DOCUMENTS

| | | |
|---|---|---|
| CN | 101646349 A | 2/2010 |
| CN | 102860301 A | 1/2013 |
| CN | 106259496 A | 1/2017 |
| CN | 106259497 A | 1/2017 |
| WO | 2008091871 A2 | 7/2008 |

OTHER PUBLICATIONS

NCBI Bookshelf, "Mineral oils, untreated or mildly treated", IARC Working Group on the Evaluation of Carcinogenic Risks to Humans. Chemical Agents and Related Occupations. Lyon (FR): International Agency for Research on Cancer; 2012 (Year: 2012).*
Bond et al. ("Neem Oil General Fact Sheet", 2012; National Pesticide Information Center, Oregon State University Extension Services. http://npic.orst.edu/factsheets/neemgen.html (accessed Jul. 3, 2024). (Year: 2012).*
Catalogue of pesticide formulation types and international coding system, No. 2, 7th Edition by CropLife International (2017).

* cited by examiner

*Primary Examiner* — Trevor Love
*Assistant Examiner* — Judith Marie Kamm
(74) *Attorney, Agent, or Firm* — Viridant IP

(57) ABSTRACT

Agricultural compositions comprising emulsifier systems for a pesticidal natural oil active ingredient are disclosed. One such composition includes a pesticidal natural oil active ingredient and an emulsifier system with a first component selected from glyceryl oleate, ethoxylated oleate, and ethoxylated soybean oil; and a second component comprising ethoxylated castor oil; wherein the ratio between the first component and said second component is between 1:3 and 3:1; and where the emulsifier system disperses the pesticidal natural oil active ingredient in a water emulsion. Methods for providing agricultural compositions and applications to control one or more pests are also disclosed.

20 Claims, 1 Drawing Sheet

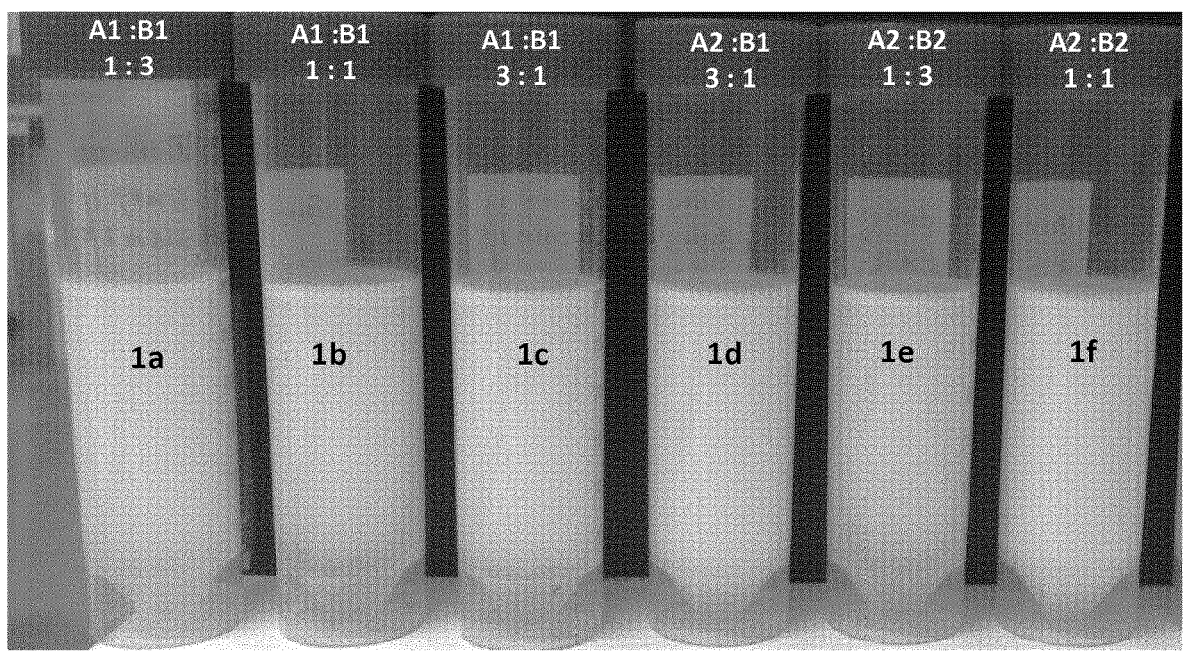

EMULSIFIER SYSTEM FOR
AGRICULTURAL COMPOSITIONS
COMPRISING A PESTICIDAL NATURAL OIL

REFERENCE TO RELATED APPLICATIONS

This application is a 371 national phase entry of Patent Cooperation Treaty application No. PCT/CA2019/051896 filed 20 Dec. 2019 entitled EMULSIFIER SYSTEM FOR AGRICULTURAL COMPOSITIONS COMPRISING A PESTICIDAL NATURAL OIL, which claims priority to, and the benefit of, U.S. provisional patent application No. 62/787,175 filed 31 Dec. 2018 entitled IMPROVED EMULSIFIER SYSTEM FOR OIL BASED AGRICULTURAL COMPOSITIONS. All of the foregoing applications which are incorporated by reference herein in their entireties.

TECHNICAL FIELD

Some embodiments of the present disclosure relate to improved emulsifier systems for agricultural compositions having improved emulsification characteristics. In particular, some embodiments of the present invention relate to emulsifier systems for oil based agricultural compositions, such as pesticidal natural oil agricultural compositions, with improved emulsification characteristics, such as improved physical and/or chemical emulsifier characteristics. In some embodiments, such improved emulsifier characteristics may comprise characteristics such as physical handling, physical and chemical consistency and stability of the agricultural composition enabling improved storage, mixing and application of the composition such as for agricultural, horticultural or structural pest control.

BACKGROUND

Agricultural compositions, such as pesticides, including fungicides, herbicides, nematicides and insecticides; plant nutrition, and plant health preparations are important compositions for use in domestic, horticultural, agricultural, industrial and commercial settings, such as to provide for control of unwanted pests and/or pathogens, or for improving the health of plants or crops. Providing for effective pest control is of high importance in many such settings, since pests and/or other pathogens if not controlled can cause loss and or destruction of crops or other plants, or harm to animals, humans or other beneficial or desired organisms. There remains a need for environmentally safe and effective pesticides, including fungicidal, nematicidal and insecticidal pesticide compositions that enhance the utility and efficacy of pesticides, so that pesticides can be used in a more environmentally safe and effective manner.

Pesticide and/or plant health compositions may typically comprise one or more active components, and commonly also comprise an emulsifier or surfactant component to assist with emulsification, dispersion, suspension, or other dispersal of the active compound or other composition components in a solvent or diluent, such as water. An important class of pesticidal and/or plant health active components include oil based active components or oil-based active ingredients. Such oil-based active components may comprise both synthetic and naturally or biologically-derived active components, for example. Some examples of such oil-based natural or biologically-derived pesticidal and/or plant health compounds have been proposed for use in place of some chemical pesticides, in order to attempt to reduce the toxicity, health and environmental risks associated with chemical pesticide use. Pesticidal natural oils are a known class of biopesticides, including for uses in control of insect, fungal, nematode, bacterial and weed pests, for example. Efficacious and easy use of such pesticidal and/or plant health compositions comprising oil-based active components requires effective emulsification components, such as to provide for desired physical properties (such as homogeneity, emulsion stability, thermal stability of concentrated composition, etc.) of the emulsified composition in common solvents or diluents used in pest control and/or plant health applications, such as water.

There remains a need to provide improved emulsification components and systems for agricultural compositions with oil-based active components such as to allow for safe, easy, effective, economical and environmentally and ecologically safe control of insect, plant, fungal, nematode, mollusk, mite, viral and bacterial pests and application of oil-based plant health components. In particular, there remains a need to provide improved emulsifier systems for natural pesticidal oil based pesticidal and/or plant health compositions having improved physical characteristics, including one or more of improved low temperature flow characteristics, formulation clarity and homogeneity, emulsion stability and homogeneity, and pH and/or water hardness tolerance, for example.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

In some embodiments of the present invention, novel agricultural compositions are disclosed comprising: an oil-based active ingredient; an emulsifier system comprising a first component selected from the list comprising: glyceryl oleate, ethoxylated oleate, and ethoxylated soybean oil; and a second component comprising ethoxylated castor oil; wherein the ratio between said first component and said second component is between 1:3 and 3:1. In some such embodiments, the emulsifier system is desirably operable to disperse the oil-based active ingredient in a water emulsion, such as may be suitable for agricultural, horticultural and/or pest control application. In some embodiments, the oil-based active ingredient may comprise at least one of a natural oil, a botanical oil, a plant-derived oil, a synthetic oil, a pesticidal oil, and a natural pesticidal oil. In some particular embodiments, the agricultural composition may comprise one or more oil-based active ingredient and the emulsifier system in a ratio between about 20:1 and 2:1, for example.

In some embodiments, the agricultural composition may additionally comprise at least one additional adjuvant, modifier, solvent, co-emulsifier, surfactant, spreader, sticker, penetrant, or other agriculturally acceptable component. In some embodiments, the agricultural composition may additionally comprise at least one co-emulsifier, such as at least one co-emulsifier selected from the list comprising: sorbitan oleate, sorbitan stearate, and glyceryl stearate, for example. In some embodiments, the agricultural composition may additionally comprise at least one hydrocarbon solvent. In some such embodiments, the composition may additionally comprise at least one pour point depressant, which in combination with the hydrocarbon solvent are effective to reduce a pour point temperature of an oil-based active ingredient, such as a pesticidal natural oil active ingredient, in said composition.

In some embodiments, the agricultural composition comprises at least one pesticidal natural oil active ingredient selected from the list comprising: neem oil, karanja oil, cinnamon oil, clove oil, eugenol, oregano oil, thyme oil, garlic oil, anise oil, geranium oil, lime oil, peppermint oil, lavender oil, and combinations thereof or extracts therefrom. In some embodiments, the agricultural composition may additionally comprise a hydrocarbon solvent comprising at least one of: an alcohol, a natural oil, a terpene, and a terpenoid. In some particular such embodiments, the hydrocarbon solvent may comprise at least one cyclic terpene such as at least one of: l-limonene, d-limonene and dipentene, for example.

In some embodiments, the pesticidal composition may desirably a natural oil active ingredient comprising neem oil. In another embodiment, the pesticidal natural active ingredient may comprise karanja oil (also referred to as pongamia oil).

In some embodiments, the agricultural composition comprises first and second emulsifier system components which are listed by the US Environmental Protection Agency (EPA) as a Minimal Risk Inert Pesticide Ingredient (4A) (i.e. the list of ingredients published by the US EPA as FIFRA 4A list published August 2004 entitled "List 4A—Minimal Risk Inert Ingredients") or, listed by the EPA as Inert Pesticide Ingredients (4B) (the US EPA FIFRA 4b list published August 2004 entitled "List 4B—Other ingredients for which EPA has sufficient information"), or listed under EPA regulation 40 CFR 180.950 dated May 24, 2002, each of which are hereby incorporated herein in their entirety for all purposes.

In some embodiments, the agricultural composition may additionally comprise a further surfactant which comprises at least one of: an ethoxylated natural oil, saponin, ethoxylated alcohols, ethoxylated fatty esters, alkoxylated glycols, ethoxylated fatty acids, carboxylated alcohols, carboxylic acids, fatty acids, ethoxylated alkylphenols, fatty esters, sodium dodecylsulfide, other fatty acid-based surfactants, other natural or synthetic surfactants, or combinations thereof. In some particular such embodiments, the further surfactant may comprise a non-ionic surfactant.

In some embodiments, the agricultural composition may additionally comprise a diluent. In some particular such embodiments, the diluent may comprise at least one neutral oil component, such as one or more of a safflower, canola, vegetable, or mineral oil. In some other such embodiments, the diluent may comprise at least one of: isopropyl alcohol, isopropyl myristate, and combinations thereof. In a further such embodiment, the diluent may additionally comprise at least one carrier component.

In some embodiments, the agricultural composition may comprise at least one oil-based natural pesticidal active ingredient. In some particular such embodiments, the oil-based natural pesticidal active ingredient may comprise an extract of at least one natural pesticidal oil. In some embodiments, the pesticidal composition may comprise a natural pesticidal oil active ingredient which comprises at least one NOP-listed organic natural oil, listed under the US Department of Agriculture (USDA) National Organic Program (NOP), or OMRI, or other organic or other selected agricultural standard certification for example, such as may be listed by the USDA as allowable for use in organic agricultural production or the like.

In some embodiments, an agricultural composition may be provided such that the composition comprises a substantially homogenous agricultural concentrate, wherein:

the oil-based active ingredient comprises 50 to 90 wt %; and the emulsifier system comprises 4 to 25 wt %; wherein the emulsifier system comprises a first component selected from the list comprising: glyceryl oleate, ethoxylated oleate, and ethoxylated soybean oil; and a second component comprising ethoxylated castor oil; wherein the ratio between said first component and said second component is between 1:3 and 3:1.

In some further embodiments, a method of making a diluted agricultural composition including at least one oil-based active ingredient is provided. In some such embodiments, the method comprises:

providing a homogenous concentrate composition which comprises:

an oil-based active ingredient;

an emulsifier system operable to disperse the oil-based active ingredient in a water emulsion, the emulsifier system comprising a first component selected from the list comprising: glyceryl oleate, ethoxylated oleate, and ethoxylated soybean oil; and a second component comprising ethoxylated castor oil; wherein the ratio between said first component and said second component is between 1:3 and 3:1; and diluting the concentrate with water to form an oil in water emulsion diluted formulation comprising the at least one oil-based active ingredient.

In some such embodiments, the agricultural composition may additionally comprise at least one additional adjuvant, modifier, solvent, co-emulsifier, surfactant, spreader, sticker, penetrant, or other agriculturally acceptable component. In some embodiments, the agricultural composition may additionally comprise at least one co-emulsifier, such as at least one co-emulsifier selected from the list comprising: sorbitan oleate, sorbitan stearate, and glyceryl stearate, for example. In some embodiments, the agricultural composition may additionally comprise at least one hydrocarbon solvent. In some such embodiments, the composition may additionally comprise at least one pour point depressant, which in combination with the hydrocarbon solvent are effective to reduce a pour point temperature of an oil-based active ingredient, such as a pesticidal natural oil active ingredient, in said composition.

In some further embodiments, the agricultural composition additionally comprises at least one diluent or carrier component. In one such embodiment, the at least one diluent or carrier may comprise a neutral oil, such as a mineral or vegetable oil, for example.

In a further embodiment according to the present disclosure, a method of enhancing the physical properties of a pesticidal natural oil active ingredient comprising at least one of neem and karanja oil is provided, the method comprising:

preparing a homogenous pesticidal concentrate composition comprising:

said pesticidal natural oil active ingredient comprising at least one of neem and karanja oil;

an emulsifier system operable to disperse the oil-based active ingredient in a water emulsion, the emulsifier system comprising a first component selected from the list comprising: glyceryl oleate, ethoxylated oleate, and ethoxylated soybean oil; and a second component comprising ethoxylated castor oil; wherein the ratio between said first component and said second component is between 1:3 and 3:1; and diluting the pesticidal concentrate with water to form an oil-in-water emulsion diluted formulation comprising the at least one pesticidal natural oil active ingredient adapted for application to plants.

In yet another embodiment according to the present disclosure, a method of applying at least one agricultural composition comprising at least one pesticidal natural oil to control at least one target pest is provided. In one such embodiment, the method comprises:

preparing a homogenous pesticidal concentrate composition according to the method of enhancing the physical properties of a pesticidal natural oil active ingredient described directly above; and applying the oil-in-water emulsion diluted pesticidal formulation to at least one plant, the locus thereof, or propagation material thereof, which is susceptible to or infested with the at least one pest.

In some particular such embodiments, the diluted pesticidal formulation may be applied to the at least one plant, locus thereof, or propagation material thereof, in a pesticidally effective amount to desirably provide for control of the at least one pest, for example.

In addition to the exemplary aspects and embodiments described above, further aspects and embodiments will become apparent by reference to the following drawing and description.

BRIEF DESCRIPTION OF THE DRAWING

FIG. 1 is a photograph of several exemplary diluted aqueous agricultural compositions prepared according to an embodiment of the present disclosure, shown 24 hours after dilution and shaking to emulsify the compositions in water.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and tables/drawings are to be regarded in an illustrative, rather than a restrictive, sense.

Unless defined otherwise, all technical and scientific terms used herein have the same meaning as commonly understood by one of ordinary skill in the art to which this disclosure belongs.

As used herein, singular forms include plural references unless the context clearly dictates otherwise. As used herein, "comprises" or "comprising" are to be interpreted in their open-ended sense, i.e. as specifying that the stated features, elements, steps or components referred to are present, but not excluding the presence or addition of further features, elements, steps or components.

As used herein, all numerical values or numerical ranges provided expressly include integers within such ranges and fractions of the values or the integers within ranges unless the context clearly indicates otherwise. Thus, for example, reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. Therefore, as used herein, where a range of values is provided, it is understood that each intervening value between the upper and lower limit of that range and any other stated or intervening value within that stated range is encompassed within embodiments of the disclosure. The upper and lower limits of these smaller ranges may independently define a smaller range of values, and it is to be understood that these smaller ranges are intended to be encompassed within embodiments of the disclosure, subject to any specifically excluded limit in the stated range.

As used herein, "agricultural composition" comprises compositions which have (but are not limited to) at least one use for application to plants, and include but are not limited to agricultural or horticultural compositions, pesticidal compositions (and which may also be usable for applications in structural pest control), plant nutrition compositions, plant health compositions, plant defense compositions, plant immunity compositions, and plant biostimulant compositions, for example.

As used herein, "plant" embraces individual plants or plant varieties of any type of plants, in particular agricultural, silvicultural and ornamental plants.

As used herein, the terms "pest" or "pests" or grammatical equivalents thereof, are understood to refer to organisms, e.g., including pathogens, that negatively affect a host or other organism—such as a plant or an animal—by colonizing, damaging, attacking, competing with them for nutrients, infesting or infecting them, as well as undesired organisms that infest human structures, dwellings, living spaces or foodstuffs. Pests include but are not limited to fungi, weeds, nematodes, acari, and arthropods, including insects. It is understood that the terms "pest" or "pests" or grammatical equivalents thereof can refer to organisms that have negative effects by infesting plants and seeds, and commodities such as stored grain or other agricultural products.

As used herein, the terms "pesticide" or "pesticidal" or grammatical equivalents thereof, are understood to refer to any composition or substance that can be used in the control of any agricultural, natural environmental, and domestic/household pests. The terms "control" or "controlling" are meant to include, but are not limited to, any killing, inhibiting, growth regulating, or pestistatic (inhibiting or otherwise interfering with the normal life cycle of the pest) activities of a composition against a given pest. These terms include for example sterilizing activities which prevent the production or normal development of seeds, ova, sperm or spores, cause death of seeds, sperm, ova or spores, or otherwise cause severe injury to the genetic material. Further activities intended to be encompassed within the scope of the terms "control" or "controlling" include preventing larvae from developing into mature progeny, modulating the emergence of pests from eggs including preventing eclosion, degrading the egg material, suffocation, interfering with mycelial growth, reducing gut motility, inhibiting the formation of chitin, disrupting mating or sexual communication, preventing feeding (antifeedant) activity, and interfering with location of hosts, mates or nutrient-sources. The term "pesticide" includes fungicides, herbicides, nematicides, insecticides and the like. The term "pesticide" encompasses, but is not limited to, naturally occurring compounds as well as so-called "synthetic chemical pesticides" having structures or formulations that are not naturally occurring, where pesticides may be obtained by various means including, but not limited to, extraction from biological sources, chemical synthesis of the compound, and chemical modification of naturally occurring compounds obtained from biological sources.

As used herein, the terms "control" or "controlling" or grammatical equivalents thereof, are understood to encompass any pesticidal (killing) activities or pestistatic (inhibiting, repelling, deterring, and generally interfering with pest functions to prevent the damage to the host plant) activities of a pesticidal composition against a given pest. Thus, the terms "control" or "controlling" or grammatical equivalents thereof, not only include killing, but also include such activities as repelling, deterring, inhibiting or killing egg development or hatching, inhibiting maturation or development, and chemi-sterilization of larvae or adults. Repellant or deterrent activities may be the result of compounds that are poisonous, mildly toxic, or non-poisonous to pests, or may act as pheromones in the environment.

As used herein, the term "pesticidally effective amount" generally means the amount of the inventive mixtures or of compositions comprising the mixtures needed to achieve an observable effect on growth, including the effects of necrosis, death, retardation, prevention, and removal, destruction, or otherwise diminishing the occurrence and activity of the target pest organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

In some embodiments of the present invention, novel agricultural compositions are disclosed comprising: an oil-based active ingredient; an emulsifier system comprising a first component selected from the list comprising: glyceryl oleate, ethoxylated oleate, and ethoxylated soybean oil; and a second component comprising ethoxylated castor oil; wherein the ratio between said first component and said second component is between 1:3 and 3:1. In some such embodiments, the emulsifier system is desirably operable to disperse the oil-based active ingredient in a water emulsion, such as may be suitable for agricultural, horticultural and/or pest control application. In some embodiments, the oil-based active ingredient may comprise at least one of a natural oil, a botanical oil, a plant-derived oil, a synthetic oil, a pesticidal oil, and a natural pesticidal oil. In some particular embodiments, the agricultural composition may comprise one or more oil-based active ingredient and the emulsifier system in a ratio between about 20:1 and 2:1, for example.

In some embodiments, the agricultural composition may additionally comprise at least one additional adjuvant, modifier, solvent, co-emulsifier, surfactant, spreader, sticker, penetrant, or other agriculturally acceptable component. In some embodiments, the agricultural composition may additionally comprise at least one co-emulsifier, such as at least one co-emulsifier selected from the list comprising: sorbitan oleate, sorbitan stearate, and glyceryl stearate, for example. In some embodiments, the agricultural composition may additionally comprise at least one hydrocarbon solvent. In some such embodiments, the composition may additionally comprise at least one pour point depressant, which in combination with the hydrocarbon solvent are effective to reduce a pour point temperature of an oil-based active ingredient, such as a pesticidal natural oil active ingredient, in said composition.

In some embodiments, the pesticidal composition comprises a pour point depressant. Some exemplary such pour point depressants may comprise polymeric pour point depressant material. As used herein, the term "polymeric material" is used to describe a material, compound or composition that is defined by or includes at least one polymer or a derivative thereof. In one non-limiting example, the polymeric material includes acrylic acid, acrylate, or other acryl-derived units. In other examples, the polymeric material may include derivatives of alkyl aromatic compounds and/or one or more derivatives thereof. In one specific example, the polymeric material may comprise a poly acrylic methacrylate (PAMA) pour point depressant polymeric material, for example. Exemplary such PAMA polymeric pour point depressants may be commercially obtained from Dai-Ichi Karkaria Ltd. of Maharashtra, India, The Lubrizol Corporation, OH, USA, Evonik Oil Additives GMBH, of Darmstadt, Germany (as an Evonik Viscoplex™ 10-series polymeric pour point depressant), or from A S Harrison Co, Pty, of Sydney Australia. It should be appreciated that a mixture of two or more of the foregoing non-limiting polymeric material examples could also be included in one or more of the pesticidal compositions described in this disclosure.

In some embodiments, an optional hydrocarbon solvent component may comprise limonene, such as but not limited to d-limonene, as is widely commercially available, such as from Sigma-Aldrich (now Millipore Sigma) of St. Louis, MO, USA, Univar USA, of Redmond, WA, USA, Vigon International, Inc., of E. Stroudsburg, PA, USA, Wego Chemical, of Great Neck, NY, USA, Penta International Corporation, of Livingston, NJ, USA, Parchem Chemicals, of New Rochelle, NY, USA, and Resolute Oil, of League City, TX, USA, for example.

In one aspect, an agricultural composition according to some embodiments of the present disclosure additionally comprises one or more suitable carrier or diluent component. A suitable carrier or diluent component can be selected by one skilled in the art, depending on the particular application desired and the conditions of use of the composition. Commonly used carriers and diluents may include ethanol, isopropanol, isopropyl myristate, other alcohols, water, neutral oils such as one or more of mineral and vegetable oils, and other inert carriers, such as but not limited to those listed by the EPA as a Minimal Risk Inert Pesticide Ingredients (4A) (the list of ingredients published dated December 2015 by the US EPA FIFRA 4a list published August 2004 entitled "List 4A—Minimal Risk Inert Ingredients") or, for example, Inert Pesticide Ingredients (4B) (the US EPA FIFRA 4b list published August 2004 entitled "List 4B—Other ingredients for which EPA has sufficient information") or under EPA regulation 40 CFR 180.950 dated May 24, 2002, each of which is hereby incorporated herein in its entirety for all purposes.

In some embodiments, agricultural compositions herein disclosed may also be used, for reasons such as but not limited to economy, physical and chemical stability and synergy, with acaricides, algicides, antifeedants, avicides, bactericides, bird repellents, chemosterilants, fungicides, herbicide safeners, herbicides, insect attractants, insect repellents, mammal repellents, mating disrupters, molluscicides, other insecticides, other pesticides, plant activators, plant growth regulators, rodenticides, synergists, adjuvants, defoliants, desiccants, disinfectants, semiochemicals, and virucides (these categories not necessarily mutually exclusive), for example.

In some embodiments, agricultural compositions described in this disclosure may also be provided with phytologically-acceptable inert ingredients to provide or complement a carrier and can be formulated into, for example, concentrated emulsions, dusts, emulsifiable concentrates, gels, granules, microencapsulations, seed treatments, suspension concentrates, suspension emulsions, and pellets, for example. For further information on suitable such formulation types known to those of skill in the art, reference may be made to publications such as, for example: "CATALOGUE OF PESTICIDE FORMULATION TYPES AND INTERNATIONAL CODING SYSTEM" Technical Monograph No 2, 5th Edition by CropLife International (2002).

In some embodiments, agricultural compositions according to aspects of the present disclosure may be applied as aqueous suspensions or emulsions prepared from concentrated formulations of such compositions. Such water-soluble, water-suspendable, or emulsifiable formulations may be provided as liquids typically known as emulsifiable concentrates, aqueous suspensions or oil suspensions. In an alternative embodiment, agricultural compositions may alternatively be provided as solids, typically known as wettable powders, or water dispersible granules. In such embodiments, wettable powders, which may be compacted to form water dispersible granules, comprise an intimate mixture of the agricultural composition, and a carrier, for example.

In some embodiments, agricultural compositions according to aspects of the present disclosure may be provided as emulsifiable concentrates.

In some alternative embodiments, agricultural compositions according to aspects of the present disclosure may be applied as granular formulations that are particularly useful for applications to soil. Exemplary such granular formulations may contain the agricultural composition dispersed in a carrier that comprises clay or a similar substance. Such formulations may typically be prepared by dissolving the agricultural composition in a suitable solvent and applying it to a granular carrier which has been pre-formed to the appropriate particle size, such as in the range of from about 0.5 to 3 mm. Such formulations may also be formulated by making a dough or paste of the carrier and agricultural composition and crushing and drying to obtain the desired granular particle size.

In some further embodiments, dusts, granules, gels or particles containing an agricultural composition may be prepared by intimately mixing the agricultural composition with a suitable dust, granular, gel or particulate agricultural carrier, such as kaolin clay, ground volcanic rock, peat, cellulose, clays, hydrogels, charcoal, and the like, for example. Dusts, granules, gels or particles can be applied as suitable, such as a seed dressing, soil amendment, top dressing, or as a foliar application with a dust blowing machine in the case of dusts, for example.

In some embodiments, agricultural compositions may also be applied to treatment loci in the form of an aerosol formulation. In such formulations, the agricultural composition may typically be dissolved or dispersed in an aerosol carrier, such as a pressure-generating propellant mixture. The aerosol formulation may be packaged in or compressed within a container from which the mixture is dispensed through an atomizing valve, for example.

Other Formulation Components

In some embodiments, when the agricultural compositions disclosed in this disclosure are used in a formulation, such formulation may also contain other components. These components include, but are not limited to, (for greater clarity, the following is a non-exhaustive and non-mutually exclusive list) wetters, spreaders, stickers, penetrants, buffers, sequestering agents, drift reduction agents, compatibility agents, anti-foam agents, cleaning agents, rheology modifying agents, stabilizers, dispersing agents, and co-emulsifiers. A few exemplary such additional formulation components are described below.

A wetting agent is a substance that when added to a liquid increases the spreading or penetration power of the liquid by reducing the interfacial tension between the liquid and the surface on which it is spreading. Wetting agents are used for two main functions in agrochemical formulations: during processing and manufacture to increase the rate of wetting of powders in water to make concentrates for soluble liquids or suspension concentrates; and during mixing of a product with water in a spray tank to reduce the wetting time of wettable powders and to improve the penetration of water into water-dispersible granules. Examples of wetting agents used in wettable powder, suspension concentrate, and water-dispersible granule formulations are: sodium lauryl sulphate; sodium dioctyl sulphosuccinate; alkyl phenol ethoxylates; and aliphatic alcohol ethoxylates.

A dispersing agent is a substance which adsorbs onto the surface of particles and helps to preserve the state of dispersion of the particles and prevents them from reaggregating. Dispersing agents are added to agrochemical formulations to facilitate dispersion and suspension during manufacture, and to ensure the particles redisperse into water in a spray tank. They are widely used in wettable powders, suspension concentrates and water-dispersible granules. Surfactants that are used as dispersing agents have the ability to adsorb strongly onto a particle surface and provide a charged or steric barrier to reaggregation of particles. The most commonly used surfactants are anionic, non-ionic, or mixtures of the two types. For wettable powder formulations, the most common dispersing agents are sodium lignosulphonates. For suspension concentrates, very good adsorption and stabilization are obtained using polyelectrolytes, such as sodium naphthalene sulphonate formaldehyde condensates. Tristyrylphenol ethoxylate phosphate esters are also used. Non-ionics such as alkylarylethylene oxide condensates and EO-PO block copolymers are sometimes combined with anionics as dispersing agents for suspension concentrates. In recent years, new types of very high molecular weight polymeric surfactants have been developed as dispersing agents. These have very long hydrophobic 'backbones' and a large number of ethylene oxide chains forming the 'teeth' of a 'comb' surfactant. These high molecular weight polymers can give very good long-term stability to suspension concentrates because the hydrophobic backbones have many anchoring points onto the particle surfaces. Examples of dispersing agents used in agrochemical formulations are: sodium lignosulphonates; sodium naphthalene sulphonate formaldehyde condensates; tristyrylphenol ethoxylate phosphate esters; aliphatic alcohol ethoxylates; alkyl ethoxylates; EO-PO block copolymers; and graft copolymers.

A solubilizing agent is a surfactant which will form micelles in water at concentrations above the critical micelle concentration. The micelles are then able to dissolve or solubilize water-insoluble materials inside the hydrophobic part of the micelle. Exemplary types of surfactants usually used for solubilization include non-ionics: sorbitan monooleates; sorbitan monooleate ethoxylates; and methyl oleate esters.

Thickeners or gelling agents may be typically used mainly in the formulation of suspension concentrates, emulsions and suspoemulsions to modify the rheology or flow properties of the liquid and to prevent separation and settling of the dispersed particles or droplets. Thickening, gelling, and anti-settling agents generally fall into two categories, namely water-insoluble particulates and water-soluble polymers. In some examples, it is possible to produce suspension concentrate formulations using clays and silicas. Examples of these types of materials, include, but are limited to, montmorillonite, e.g. bentonite; magnesium aluminum silicate; and attapulgite. Water-soluble polysaccharides have been used as thickening-gelling agents for many years. The types of polysaccharides most commonly used are natural extracts of seeds and seaweeds are synthetic derivatives of cellulose. Examples of these types of materials include, but are not limited to, guar gum; locust bean gum; carrageenam; alginates; methyl cellulose; sodium carboxymethyl cellulose (SCMC); hydroxyethyl cellulose (HEC). Other types of anti-settling agents are based on modified starches, polyacrylates, polyvinyl alcohol, polyethylene oxide and xanthan gum.

The presence of surfactants, which lower interfacial tension, often causes water-based formulations to foam during mixing operations in production and in application of a pesticidal composition through a spray tank. In order to reduce the tendency to foam, anti-foam agents are often added either during the production stage or before filling into bottles. Generally, there are two types of anti-foam agents, namely silicones and non-silicones. Silicones may usually comprise aqueous emulsions of dimethyl polysiloxane while the non-silicone anti-foam agents comprise water-insoluble oils, such as octanol and nonanol, or silica. In both cases, the function of the anti-foam agent is to displace the surfactant from the air-water interface. For further information on suitable such other formulation components known to those of skill in the art, reference may be made to publications such as, for example: "CHEMISTRY AND TECHNOLOGY OF AGROCHEMICAL FORMULATIONS" edited by D. A. Knowles, copyright 1998 by Kluwer Academic Publishers; and/or: "INSECTICIDES IN AGRICULTURE AND ENVIRONMENT—RETROSPECTS AND PROSPECTS" by A. S. Perry, I. Yamamoto, I. Ishaaya, and R. Perry, copyright 1998 by Springer-Verlag.

Pesticidal Applications

In some embodiments, the actual amount of an agricultural composition to be applied to loci of pests may generally not be critical and can readily be determined by those skilled in the art through experience and/or trial and error in application rates, for example. In general, concentrations within a range of about 0.01 grams of a pesticidal or other active ingredient per hectare to about 5000 grams of active ingredient per hectare may commonly be used to establish a desired range of application rates expected to provide good control.

EXAMPLES

Exemplary embodiments of the present invention are further described with reference to the following examples, which are intended to be illustrative and non-limiting in nature.

Example 1

FIG. 1 depicts a photographic representation of several exemplary diluted aqueous agricultural compositions prepared according to an embodiment of the present disclosure, and several diluted control compositions for comparison, shown 24 hours after dilution and shaking to emulsify the compositions in water. Each of the agricultural and control compositions comprise cold pressed neem oil as an exemplary oil-based active ingredient, and are shown diluted in water to a concentration of 1 neem oil by volume. Proceeding from the test tube at the left side of the photograph in FIG. 1 towards the right, the exemplary agricultural compositions in emulsifiable concentrate (prior to dilution in water) comprise:

TABLE 1a

Agricultural Composition Example 1a (as emulsifiable concentrate)

| Component | % by weight |
|---|---|
| Cold pressed neem oil | 85 |
| Emulsifier System: Ratio of A:B = 1:3 | |
| Ethoxylated oleate (component A1) | 3.75 |
| Ethoxylated castor oil PEG10 (component B1) | 11.25 |

TABLE 1b

Agricultural Composition Example 1b (as emulsifiable concentrate)

| Component | % by weight |
|---|---|
| Cold pressed neem oil | 85 |
| Emulsifier System: Ratio of A:B = 1:1 | |
| Ethoxylated oleate (component A1) | 7.5 |
| Ethoxylated castor oil PEG10 (component B1) | 7.5 |

TABLE 1c

Agricultural Composition Example 1c (as emulsifiable concentrate)

| Component | % by weight |
|---|---|
| Cold pressed neem oil | 85 |
| Emulsifier System: Ratio of A:B = 3:1 | |
| Ethoxylated oleate (component A1) | 11.25 |
| Ethoxylated castor oil PEG10 (component B1) | 3.75 |

TABLE 1d

Agricultural Composition Example 1d (as emulsifiable concentrate)

| Component | % by weight |
|---|---|
| Cold pressed neem oil | 85 |
| Emulsifier System: Ratio of A:B = 3:1 | |
| Glyceryl monooleate (component A2) | 11.25 |
| Ethoxylated castor oil PEG10 (component B1) | 3.75 |

TABLE 1e

Agricultural Composition Example 1e (as emulsifiable concentrate)

| Component | % by weight |
|---|---|
| Cold pressed neem oil | 85 |
| Emulsifier System: Ratio of A:B = 1:3 | |
| Glyceryl monooleate (component A2) | 3.75 |
| Ethoxylated castor oil PEG20 (component B2) | 11.25 |

TABLE 1f

Agricultural Composition Example 1f (as emulsifiable concentrate)

| Component | % by weight |
|---|---|
| Cold pressed neem oil | 85 |
| Emulsifier System: Ratio of A:B = 1:1 | |
| Glyceryl monooleate (component A2) | 3.75 |
| Ethoxylated castor oil PEG20 (component B2) | 11.25 |

For each of Examples 1a to 1f, an exemplary agricultural composition comprising cold pressed neem oil and an emulsifier system comprising a first component (component A) and a second component (component B) was prepared by mixing 850 g of cold pressed neem oil, and a total of 150 g of the emulsifier system (components A and B combined), mixed in an open container at approximately 20 C (room temperature) using a shear mixer. In some exemplary embodiments, emulsifier system component A1 comprised ethoxylated oleate, such as available as Breathru™ EM 07 from Evonik Oil Additives GMBH, of Darmstadt, DE In some embodiments, emulsifier system component A2 comprised glyceryl monooleate, such as available as Radiasurf™ 7150 from Oleon Corp. of Ertvelde, BE. In some embodiments, emulsifier system component B1 comprised ethoxylated castor oil PEG10, such as available as Etocas™ 10 from Croda Inc., of Edison, NJ, USA. In some embodiments, emulsifier system component B2 comprised ethoxylated castor oil PEG20, such as available as TEGOTEN™ R20 from Evonik Oil Additives GMBH, of Darmstadt, DE.

In some further exemplary embodiments, exemplary agricultural compositions were also prepared comprising cold pressed neem oil (85% by weight) and an emulsifier system comprising a first component and second component with ratios between first and second components of 1:3 and 3:1, including:
  ethoxylated soybean oil as the first component of the emulsifier system; and
  ethoxylated castor oil PEG30 as the second component of the emulsifier system.

In some embodiments, first and second emulsifier system components which are listed as compliant with organic agricultural product standards or one or more certification authority (such as allowed under the US Department of Agriculture National Organic Program (NOP), or OMRI listed, for example) may desirably be selected according to an embodiment of the present invention for providing an organic certifiable agricultural composition in combination with an organic certifiable oil-based active ingredient. In some such embodiments, cold pressed neem oil may be provided as one such exemplary organic certifiable active ingredient.

In some embodiments, a first emulsifier system component having a relatively high HLB value may be selected with a second emulsifier system component having a relatively low HLB value, for example. Conversely, in other embodiments, the first and second emulsifier components may be selected so as to have relatively low and relatively high HLB values. In one such embodiment, first and second emulsifier system components may be selected so as to provide a desired combined emulsifier system HLB value based on the ratio of the first and second components selected, such as may be desirable in cases where an oil-based active ingredient may require a particular HLB value for optimal emulsification, for example.

Example 2

An exemplary agricultural composition comprising neem oil, an emulsifier system comprising glyceryl monooleate and ethoxylated castor oil PEG25 as first and second components, white mineral oil, and a polymeric pour point depressant, was prepared according to the following description. In an open mixing vessel, 849 g of cold pressed neem oil, 31 g of white mineral oil, 75 g of ethoxylated castor oil PEG25, 25 g of glyceryl monooleate, and 20 g of an acrylic polymer pour point depressant were mixed using a shear mixer at approximately 20 C (room temperature). The composition of the resulting agricultural composition is therefore as shown below in Table 2:

TABLE 2

Agricultural Composition Example 2

| Component | % by weight |
|---|---|
| Cold pressed neem oil | 84.9 |
| White mineral oil | 3.1 |
| Ethoxylated castor oil PEG25 | 7.5 |
| Glyceryl monooleate | 2.5 |
| Acrylic polymer pour point depressant | 2.0 |

The resulting agricultural composition Example 2 was found to have a minimum pour point temperature of approximately 1.5-2.0 C. In one such exemplary embodiment, the white mineral oil may comprise Carnation™ mineral oil, widely commercially available such as from Sonneborn LLC, of Parsippany, NJ, USA, or Univar USA, of Redmond, WA, USA, Kraft Chemical of Melrose Park, IL, USA, Parchem Chemicals, New Rochelle, NY, USA, Petro-Canada Lubricants, of Missisauga, ON, Canada, for example. In some such embodiments, the ethoxylated castor oil PEG25 may comprise an Agnique™ CSO-25 ethoxylated castor oil available from BASF of Ludwigshafen, DE. In some such embodiments, the glyceryl monooleate may comprise a Radiasurf™ 7150 glyceryl monooleate available from Oleon Corp. of Ertvelde, BE. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, DE, or A S Harrison Co, Pty, of Sydney Australia.

Example 3

An exemplary agricultural composition comprising neem oil, an emulsifier system comprising glyceryl monooleate and ethoxylated castor oil PEG20 as first and second components, a polymeric pour point depressant, and a hydrocarbon solvent, was prepared according to the following description. In an open mixing vessel, 750 g of cold pressed neem oil, 40 g of white mineral oil, 112.5 g of ethoxylated castor oil PEG20, 37.5 g of glyceryl monooleate, 40 g of d-limonene, and 20 g of an acrylic polymer pour point depressant were mixed using a shear mixer at approximately 20 C (room temperature). The composition of the resulting agricultural composition is therefore as shown below in Table 2:

TABLE 3

Agricultural Composition Example 3

| Component | % by weight |
|---|---|
| Cold pressed neem oil | 75.0 |
| Ethoxylated castor oil PEG20 | 11.25 |
| Glyceryl monooleate | 3.75 |
| White mineral oil | 4.0 |
| d-limonene | 4.0 |
| Acrylic polymer pour point depressant | 2.0 |

The resulting pesticidal composition Example 3 was found to have a minimum pour point temperature of approximately 0-1.5 C. In one such exemplary embodiment, the white mineral oil may comprise Carnation™ mineral oil or equivalent, widely commercially available such as from Sonneborn LLC, of Parsippany, NJ, USA, or Univar USA, of Redmond, WA, USA, Kraft Chemical of Melrose Park, IL, USA, Parchem Chemicals, New Rochelle, NY, USA, Petro-Canada Lubricants, of Missisauga, ON, Canada, for example. In some such embodiments, the ethoxylated castor oil PEG20 may comprise a TEGOTEN™ R20 ethoxylated castor oil available from BASF of Ludwigshafen, DE. In some such embodiments, the glyceryl monooleate may comprise a Radiasurf™ 7150 glyceryl monooleate available from Oleon Corp. of Ertvelde, BE., or as is otherwise also widely commercially available, such as from LUENA-Tenside GmbH, of Leuna, DE., SigmaChem Corp. of Xiamen, CN, BASF Canada, of Missisauga, ON, CA, BASF GmbH, of Ludwigshafen, DE., and Wuhan Shengmao Corp., of Wuhan, CT, for example. In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, DE, or A S Harrison Co, Pty, of Sydney Australia. In some embodiments, d-limonene as a hydrocarbon solvent may comprise d-limonene obtained from known vendors, as widely commercially available, such as from Sigma-Aldrich (now Millipore Sigma) of St. Louis, MO, USA, Univar USA, of Redmond, WA, USA, Vigon International, Inc., of E. Stroudsburg, PA, USA, Wego Chemical, of Great Neck, NY, USA, Penta International Corporation, of Livingston, NJ, USA, Parchem Chemicals, of New Rochelle, NY, USA, and Resolute Oil, of League City, TX, USA, for example.

Example 4

An exemplary agricultural composition comprising karanja oil, an emulsifier system comprising glyceryl monooleate and ethoxylated castor oil PEG25 as first and second components, white mineral oil, a polymeric pour point depressant, and a hydrocarbon solvent, was prepared according to the following description. In an open mixing vessel, 750 g of cold pressed karanja oil, 40 g of white mineral oil, 150 g of ethoxylated castor oil oleate surfactant, 40 g of d-limonene, and 20 g of an acrylic polymer pour point depressant were mixed using a shear mixer at approximately 20 C (room temperature). The composition of the resulting pesticidal composition is therefore as shown below in Table 6:

TABLE 4

Agricultural Composition Example 4

| Component | % by weight |
|---|---|
| Cold pressed karanja oil | 75.0 |
| White mineral oil | 4.0 |
| Ethoxylated castor oil PEG25 | 11.25 |
| Glyceryl monooleate | 3.75 |
| d-limonene | 4.0 |
| Acrylic polymer pour point depressant | 2.0 |

In one such exemplary embodiment, the white mineral oil may comprise Carnation™ mineral oil or equivalent, widely commercially available such as from Sonneborn LLC, of Parsippany, NJ, USA, or Univar USA, of Redmond, WA, USA, Kraft Chemical of Melrose Park, IL, USA, Parchem Chemicals, New Rochelle, NY, USA, Petro-Canada Lubricants, of Missisauga, ON, Canada, for example. In some such embodiments, the ethoxylated castor oil PEG25 may comprise an Agnique™ CSO-25 ethoxylated castor oil available from BASF of Ludwigshafen, DE. In some such embodiments, the glyceryl monooleate may comprise a Radiasurf™ 7150 glyceryl monooleate available from Oleon Corp. of Ertvelde, BE, or as is otherwise widely commercially available, such as from LUENA-Tenside GmbH, or Leuna, DE, SigmaChem Corp. of Xiamen, CT, BASF Canada, of Missisauga, ON, CA, BASF GmbH, of Ludwigshafen, DE, and Wuhan Shengmao Corp., of Wuhan, CT, for example.

In some embodiments, the acrylic polymer pour point depressant may comprise a polyalkyl methacrylate (PAMA) polymer in a neutral carrier oil as is available from Dai-Ichi Karkaria Ltd. of Maharashtra, India, The Lubrizol Corporation, OH, USA, as a Viscoplex™ 10-series polymeric pour point depressant from Evonik Oil Additives GMBH, of Darmstadt, DE, or A S Harrison Co, Pty, of Sydney Australia. In some embodiments, d-limonene as a hydrocarbon solvent may comprise d-limonene obtained from known vendors, as is widely commercially available, such as from Sigma-Aldrich (now Millipore Sigma) of St. Louis, MO, USA, Univar USA, of Redmond, WA, USA, Vigon International, Inc., of E. Stroudsburg, PA, USA, Wego Chemical, of Great Neck, NY, USA, Penta International Corporation, of Livingston, NJ, USA, Parchem Chemicals, of New Rochelle, NY, USA, and Resolute Oil, of League City, TX, USA, for example.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. An agricultural composition comprising
   an oil active ingredient;
   an emulsifier system comprising a first component selected from the group consisting of: glyceryl oleate, ethoxylated oleate, and ethoxylated soybean oil; and a second component comprising ethoxylated castor oil;
   wherein the weight ratio between said first component and said second component is between 1:3 and 3:1;
   wherein said emulsifier system is operable to disperse the oil active ingredient in a water emulsion.

2. The agricultural composition according to claim 1, wherein the weight ratio between said oil active ingredient and said emulsifier system is between about 20:1 and 2:1.

3. The agricultural composition according to claim 1, wherein the oil active ingredient comprises at least one of: a natural oil, a botanical oil, a plant-derived oil, a synthetic oil, a pesticidal oil, and a natural pesticidal oil.

4. The agricultural composition according to claim 1, additionally comprising at least one of: an adjuvant, a modifier, a solvent, a co-emulsifier, a surfactant, a spreader, a sticker, and a penetrant.

5. The agricultural composition according to claim 1, additionally comprising a co-emulsifier comprising at least one of sorbitan oleate, sorbitan stearate, and glyceryl stearate.

6. The agricultural composition according to claim 1, additionally comprising a hydrocarbon solvent.

7. The agricultural composition according to claim 1, additionally comprising a pour point depressant.

8. The agricultural composition according to claim 1, wherein the oil active ingredient comprises a pesticidal natural oil active ingredient selected from the group consisting of: neem oil, karanja oil, cinnamon oil, clove oil, eugenol, oregano oil, thyme oil, garlic oil, anise oil, geranium oil, lime oil, peppermint oil, lavender oil, and combinations thereof.

9. The agricultural composition according to claim 8 wherein the pesticidal natural oil active ingredient comprises neem oil or karanja oil.

10. The agricultural composition according to claim 7, wherein the pour point depressant comprises a polymeric pour point depressant, and wherein the polymeric pour point depressant comprises at least one of an acrylic polymer and an alkyl aromatic polymer.

11. The agricultural composition according to claim 10 wherein the polymeric pour point depressant comprises at least one of: a poly methacrylate, a polyalkyl methacrylate, a polyacrylate, an acrylate-styrene copolymer and an alkyl aromatic polymer.

12. The agricultural composition according to claim 11 wherein the polymeric pour point depressant additionally comprises a neutral oil.

13. The agricultural composition according to claim 1, wherein the ethoxylated castor oil comprises a PEG ethoxylation value of between 5-30.

14. The agricultural composition according to claim 6, wherein the hydrocarbon solvent comprises at least one of: an alcohol, a natural oil, a terpene, a terpenoid, l-limonene, d-limonene and dipentene.

15. The agricultural composition according to claim 1, wherein said oil active ingredient comprises at least one extract of at least one natural pesticidal oil.

16. The agricultural composition according to claim 1, wherein the composition comprises a homogenous agricultural emulsifiable concentrate.

17. A method of making a diluted agricultural composition including at least one oil active ingredient, comprising:
providing a homogenous concentrate composition comprising an agricultural composition as defined in claim 1; and
diluting the concentrate with water to form an oil in water emulsion diluted formulation comprising the oil-based active ingredient.

18. The method according to claim 17, wherein the oil active ingredient comprises a pesticidal natural oil active ingredient selected from the list comprising: neem oil, karanja oil, cinnamon oil, clove oil, eugenol, oregano oil, thyme oil, garlic oil, anise oil, geranium oil, lime oil, peppermint oil, lavender oil, and combinations thereof.

19. The method according to claim 17, wherein the oil active ingredient comprises at least one of neem oil and karanja oil.

20. A method of applying at least one agricultural composition comprising at least one pesticidal natural oil to control at least one plant pest, comprising:
providing a homogenous agricultural concentrate composition according to claim 1 wherein the oil active ingredient comprises a natural pesticidal oil; and
diluting the agricultural concentrate with water to form an oil in water emulsion diluted composition; and
applying the oil-in-water emulsion diluted agricultural composition to at least one plant, the locus thereof, or propagation material thereof, which is susceptible to or infested with the at least one plant pest.

* * * * *